United States Patent [19]

Barton

[11] Patent Number: 4,625,940
[45] Date of Patent: Dec. 2, 1986

[54] WALL SLEEVES

[75] Inventor: Bruce G. Barton, Livonia, Mich.

[73] Assignee: Thunderline Corporation, Wayne, Mich.

[21] Appl. No.: 605,800

[22] Filed: May 1, 1984

[51] Int. Cl.[4] ............................................. E04G 15/00
[52] U.S. Cl. ........................................ 249/83; 52/577; 249/39; 249/43; 249/157; 249/177
[58] Field of Search ........................ 249/39, 40, 42, 43, 249/83, 85, 96, 152, 150, 153, 177, 184, 155, 157; 285/3, 4; 52/576, 577

[56] References Cited

U.S. PATENT DOCUMENTS

| | | | |
|---|---|---|---|
| 1,482,565 | 2/1924 | Johnson et al. | 16/2 |
| 1,651,269 | 11/1927 | Gnagi | 52/741 |
| 2,098,389 | 11/1937 | Hutchison | 264/35 |
| 2,270,286 | 1/1942 | Gerriets | 52/220 |
| 2,694,847 | 11/1954 | Christiansen | 249/177 |
| 3,176,053 | 3/1965 | Di Stasio | 264/31 |
| 3,276,176 | 10/1966 | Jonsson et al. | 52/577 |
| 3,294,358 | 12/1966 | Hagedorn | 249/177 |
| 3,346,230 | 10/1967 | Tolf | 249/177 |
| 3,349,805 | 10/1967 | Fried | 285/3 |
| 3,365,152 | 1/1968 | Blunk | 248/56 |
| 3,523,552 | 8/1970 | Ogden | 249/150 |
| 3,528,668 | 9/1970 | Barton | 277/199 |
| 3,862,698 | 1/1975 | Hafele | 215/1 C |
| 3,867,804 | 2/1975 | Wilson | 52/699 |
| 4,480,855 | 11/1984 | Rosenbaum | 285/3 |

FOREIGN PATENT DOCUMENTS

| | | |
|---|---|---|
| 293809 | 2/1971 | Austria . |
| 2410256 | 9/1975 | Fed. Rep. of Germany . |
| 2100329 | 12/1982 | United Kingdom ................ 249/177 |

OTHER PUBLICATIONS

Thunderline Corp. Bul. LS-138.

Primary Examiner—Jay H. Woo
Assistant Examiner—James C. Housel
Attorney, Agent, or Firm—Kinzer, Plyer, Dorn & McEachran

[57] ABSTRACT

A one-piece, unitary, molded resin wall sleeve precursor member has cup-shaped end sections of external diameter D each having a radial flange, with each flange connecting to a hollow transition section that in turn connects to one end of a series of N coaxial sleeve sections of internal diameter D, the sleeve sections being interconnected by N−1 hollow water stop sections having diameters much larger than D. A wall sleeve assembly is derived from this precursor member by cutting off the end sections at their flanges and cutting off the transition sections to leave a wall sleeve, including the water stop and sleeve sections, having a total length L approximately equal to the width W of a concrete wall. The cup-like end sections are inserted into the ends of the wall sleeve, and their flanges afford a convenient means to anchor the resulting assembly to a concrete form.

42 Claims, 4 Drawing Figures

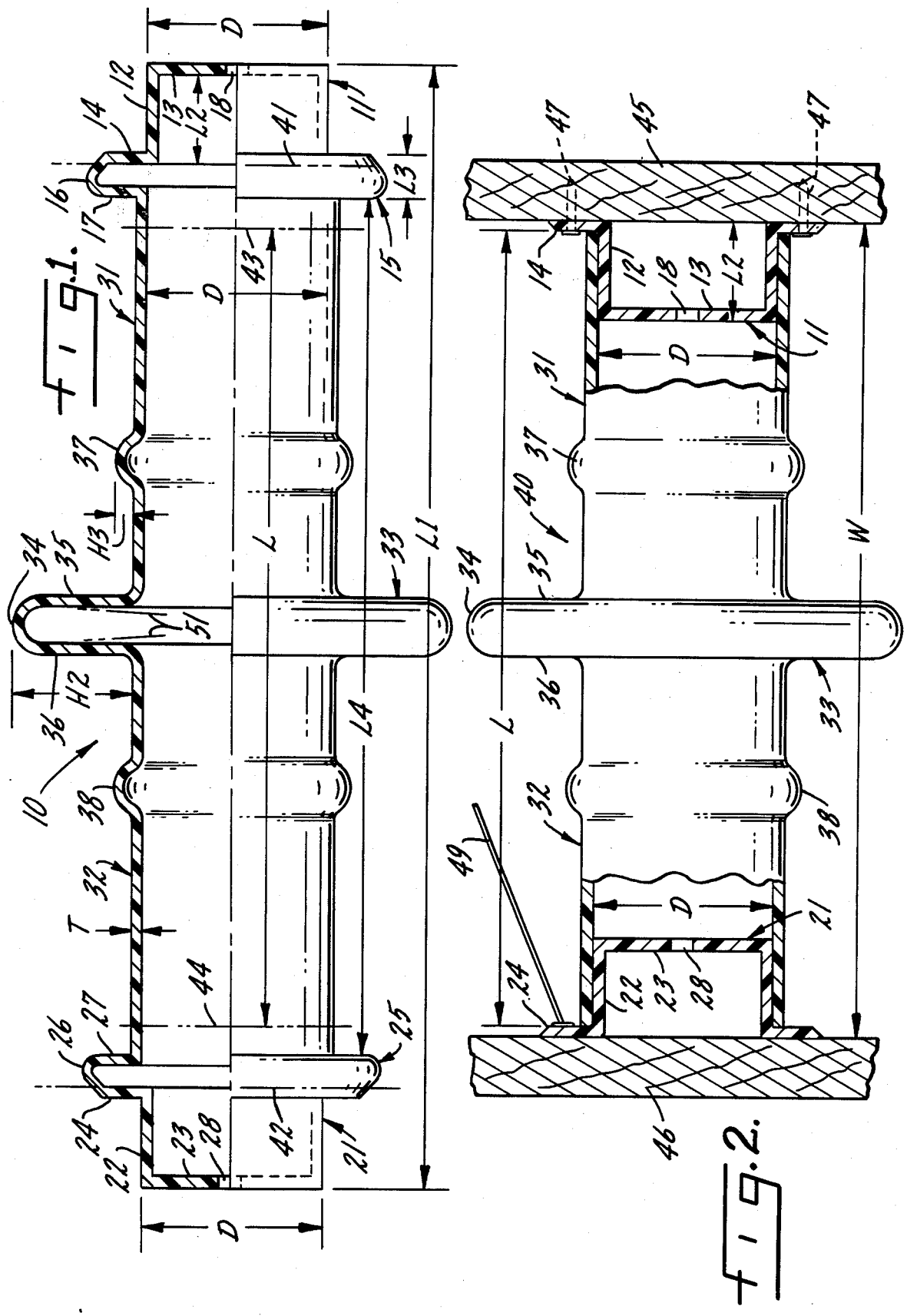

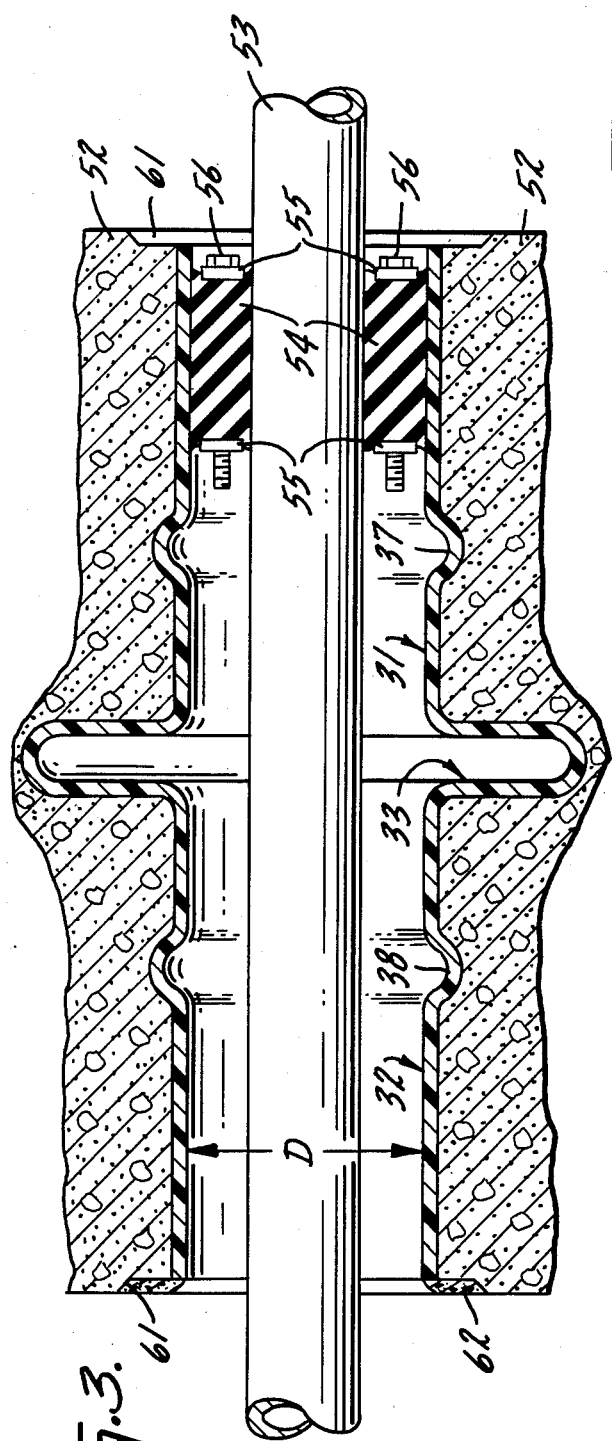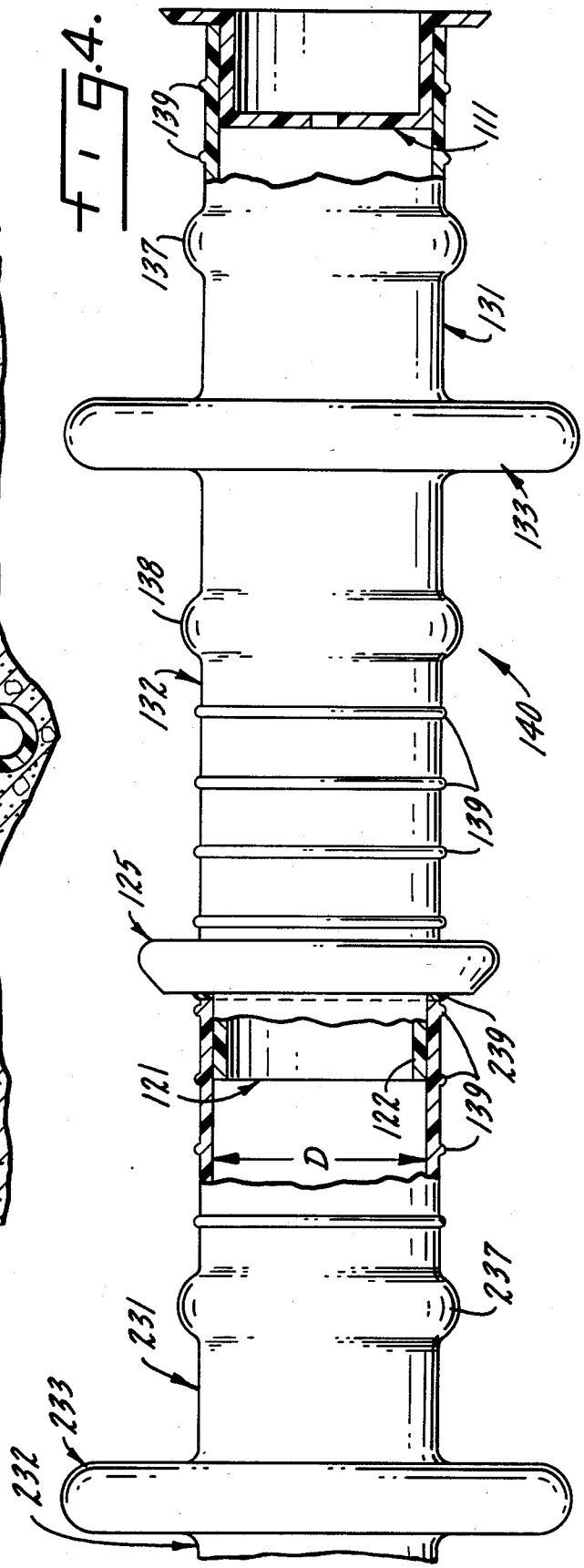

4,625,940

WALL SLEEVES

BACKGROUND OF THE INVENTION

In new construction, whether commercial, residential, or industrial, it is often necessary to extend a pipe or conduit (water, gas, electrical, etc.) through a wall or a floor. Furthermore, it is frequently desirable or even mandatory to provide a hydrostatic seal around the pipe or conduit to preclude seepage of water or other fluids through the wall or floor. The most practical and effective seal construction for applications of this kind, in most instances, is an expansion seal formed of a series of interleaved blocks of rubber or other elastomer interconnected by a sequence of pressure plates, with a plurality of bolts extending between the pressure plates; the bolts are tightened to squeeze the elastomer blocks between the pressure plates, expanding the blocks to form a continuous hydrostatic seal around the periphery of the pipe. A preferred construction for a wall seal closure of this kind is described and claimed in U.S. Pat. No. 3,528,668 of Bruce G. Barton. Other wall closure seal constructions for forming peripheral seals on pipes and conduits are also known in the art.

To assure an effective seal, in applications of this kind, it is highly desirable and often necessary to form an opening in the wall or floor, through which the pipe or conduit can extend, with an internal diameter large enough to afford an essentially symmetrical annular space between the pipe and the opening. The diameter of the wall opening may vary to a substantial extent, depending upon the outside diameter of the pipe or conduit and the particular seal to be used. Thus, the internal diameter required for the wall opening may range from just under two inches up to two feet or more. For most construction of this kind, particularly in a concrete wall, a wall sleeve extending through the concrete form is employed. Accuracy of location of the wall sleeve is an important consideration. Another potentially critical requirement, in many applications, is the prevention of water seepage between the opposite sides of the wall along the outer surface of the wall sleeve.

One practical and effective wall sleeve construction that has seen widespread use in applications of this kind is a metal tube having a length equal to the width of the wall and having a metal ring welded to the outside central portion of the metal sleeve. The metal ring serves as a water stop to preclude water seepage along the outer surface of the sleeve, at the interface between the sleeve and the concrete wall. The ring also serves as an anchor to preclude axial movement of the wall sleeve relative to the wall. This metal sleeve construction, however, presents difficult technical problems of a continuing nature.

Thus, it is quite difficult to mount the conventional metal wall sleeve in a concrete form in a manner that provides accurate location of the sleeve and that also prevents entry of concrete or debris into the sleeve. Even relatively minor variations in spacing between the concrete form panels, in the region adjacent the wall sleeve, may allow entry of concrete into the sleeve or may require dismantling an erected form to shorten the sleeve. Various arrangements have been proposed to overcome these mounting and contamination difficulties, usually involving flanges of one kind or another on the ends of the metal sleeves. However, these expedients add materially to the costs of the metal wall sleeves, which are expensive to begin with. It is also rather impractical to maintain an inventory of sleeves in stock; the wide variations in wall width and in required sleeve diameter produce too many combinations for economical storage. Further, corrosion is a continuing problem.

Another substantial problem in the use of metal wall sleeves, which are often made of steel, results from the weight of the sleeve. For small diameter steel wall sleeves, this is not a major problem. For larger sleeves however, the weight of the sleeve becomes an important factor; secure mounting of the sleeve in a concrete form, so that it will not be dislodged when the concrete is poured, becomes quite difficult. Larger sleeve sizes may also require the services of two men for installation in the form, adding to the applicable labor cost.

SUMMARY OF THE INVENTION

It is a principal object of the invention, therefore, to provide a new and improved unitary, one-piece molded resin construction for a wall sleeve precursor member that can be readily converted into an improved wall sleeve assembly for forming a passageway of given internal diameter through a concrete wall of specified width, an assembly which provides for rapid and convenient mounting in a concrete form and prevents entry of concrete or other debris into the sleeve, particularly when the wall is being poured.

A specific object of the invention is to provide a unitary, one-piece molded resin wall sleeve precursor member that is convertible into a wall sleeve assembly for forming a passageway of given internal diameter through a concrete wall, which assembly inherently compensates for minor variations in wall width by means of a hollow water stop section that is partially axially compressible to accommodate such variations.

A further object of the invention is to provide a new and improved unitary, one-piece molded resin wall sleeve precursor member, convertible into a wall sleeve assembly for forming a passageway of given internal diameter through a concrete wall, that is light in weight, simple and inexpensive to manufacture, provides superior anchorage in the wall, and affords superior operational characteristics.

Accordingly, in one aspect the invention relates to a wall sleeve precursor convertible into a wall sleeve assembly for forming a continuous unimpeded passageway of given internal diameter D through a concrete wall by cutting off end sections, transition sections, and portions of sleeve sections from a central sleeve member portion of the precursor and inserting the end sections into the remaining sleeve member. The precursor comprises first and second end sections, at opposite ends of the wall sleeve precursor member, each end section including a cylindrical body portion having an external diameter D and a substantially flat mounting flange projecting radially outwardly of the axially inner end of the body portion. First and second transition sections adjoin the first and second end sections, respectively, and join the end sections to opposite ends of a central sleeve member portion; each transition section includes an outer transition wall extending axially inwardly from the outer rim of the mounting flange of the associated end section and a transition boundary wall extending radially inwardly from the outer transition wall. The central sleeve member portion comprises N coaxial cylindrical sleeve sections of internal diameter D interposed in series between the two transition sections and N−1 annular, hollow, axially compressible water stop sections each interconnecting two adjacent sleeve sections, each water stop section having two spaced walls extending radially outwardly of the ends of the adjacent sleeve sections and interconnected by a water stop rim wall, the internal diameter of the rim wall being much larger than D.

In another aspect the invention relates to a cylindrical wall sleeve assembly for forming an unimpeded passageway of given internal diameter D through a concrete wall of given width W. The assembly comprises a unitary one-piece cylindrical molded resin sleeve member having an overall length L approximately equal to the wall width W and including N coaxial cylindrical sleeve sections each having an internal diameter D, joined together by N−1 annular, hollow, axially compressible water stop sections, each water stop section having two spaced walls extending radially outwardly of the ends of the adjaeent sleeve sections and interconnected by a water stop rim wall, the internal diameter of the rim wall being much larger than D. The assembly further comprises a pair of end members, each end member including a cylindrical body having an external diameter D to fit tightly into the open end of an outer sleeve section of the sleeve member, each end member further having a vertically substantially flat radially outwardly projecting mounting flange at its outer end which limits insertion of the end member into the sleeve member, the end member flanges serving to mount the assembly in fixed position between the opposed walls of a concrete form while allowing removal of both end members, upon dismantling of the form, for full exposure of the interior of the sleeve.

BRIEF DESCRIPTION OF THE DRAWINGS

FIG. 1 is a partially sectional side elevation view of a unitary, one-piece rotationally molded resin wall sleeve precursor member comprising one embodiment of the present invention;

FIG. 2 is an elevation view, partly in cross section, illustrating conversion of the wall sleeve precursor member of FIG. 1 into a wall sleeve assembly and installation of that assembly in a form for a concrete wall;

FIG. 3 is a sectional elevation view of the finished wall sleeve, with a pipe mounted in and sealed into the wall sleeve; and FIG. 4 is an elevation view, partly in cross section, illustrating another embodiment of the invention.

DESCRIPTION OF THE PREFERRED EMBODIMENTS

FIG. 1 illustrates a unitary, one-piece molded resin wall sleeve precursor member 10 comprising a first embodiment of the present invention; the precursor member 10 is convertible into a wall sleeve assembly for forming a passageway of given internal diameter D through a concrete wall.

The wall sleeve precursor member 10 includes first and second end sections 11 and 21. The first end section 11 includes a cylindrical body portion 12 having an external diameter D. The body portion 12 has an outer wall 13 closing off its outer end, thus affording a cup-shaped configuration for end section 11. Wall 13 may include an alignment aperture 18 at the center of the wall. The axially inner end of the body portion 12 of end section 11 comprises a flange 14 that projects radially outwardly to a diameter substantially larger than D.

The second end section 21 of precursor member 10 is of corresponding construction, including a cylindrical body 22 closed at its outside end by a wall 23 and having an outwardly projecting flange 24 at its axially inner end. Wall 23 may have a centered alignment aperture 28.

Proceeding axially inwardly from the end sections, wall sleeve precursor member 10 comprises first and second transition sections 15 and 25 adjoining end sections 11 and 21, respectively. The first transition section 15 includes an outer transition wall 16 that extends axially inwardly from the outer rim of the flange 14 on end section 11. Wall 16 merges into a transition boundary wall 17 that extends radially inwardly. This construction is duplicated at the second transition section 25, which includes an outer transition wall 26 connecting flange 24 to a radially inwardly extending transition boundary wall 27.

The wall sleeve precursor member 10 of FIG. 1 further comprises two sleeve sections 31 and 32, each having an internal diameter D, the sleeve sections being interposed in series between the two transition sections 15 and 25. Sleeve sections 31 and 32 are interconnected by a hollow water stop section 33. The water stop section 33 includes two spaced walls 35 and 36 that extend radially outwardly of the inner ends of the sleeve sections 31 and 32; walls 35 and 36 are interconnected by a water stop rim wall 34. As is clearly shown in FIG. 1, the internal diameter of the water stop rim wall 34 is much larger than the internal diameter D of the sleeve sections 31 and 32.

If more than one water stop is desired, an additional sleeve section and another water stop section can be added to precursor member 10. Since each water stop should be located centrally of the sleeve, for N sleeve sections like sections 31 and 32 there will be N−1 water stop sections like section 33. In most instances a single water stop is adequate; thus, it is typical that N=2.

As shown in FIG. 1, sleeve section 31 includes an annular external reinforcing rib 37; a similar external reinforcing rib 38 is provided in sleeve section 32. Ribs 37 and 38 are of hollow construction, each being substantially smaller in diameter than water stop section 33.

The most practical method for manufacturing the wall sleeve precursor member 10 of FIG. 1 is rotational molding. The precursor member should be formed of a non-corrosive resin; a thermoplastic resin is suitable for most situations, though a thermoset resin may be desirable in applications where high heat levels may be encountered (e.g., steam pipes). The internal diameter D of member 10 is dependent upon the application and may range from less than two inches up to two feet or more. For a two inch diameter D, the wall thickness T may be approximately 0.125 inch whereas for a diameter D of two feet the wall thickness T should be materially increased, preferably to 0.25 inch or more. For smaller sleeve diameters the reinforcing ribs 37 and 38 may be omitted; preferably, however, they are used for all sizes. While a variety of different resins may be employed, high density polyethylene has been found to be satisfactory for most applications.

Typically, the overall length L1 of the wall sleeve precursor member 10 may be approximately nineteen inches. A suitable length L2 for each of the end sections 11 and 21 is 1.5 inches and the axial length L3 for each of the transition sections 15 and 25 may be approximately 0.75 inch. This leaves an effective usable sleeve length L4, between transition sections 15 and 25, of approximately 14.5 inches. This length L4 is adequate for the great majority of concrete walls and floors requiring wall sleeves, regardless of variations in the required diameter D for such sleeves. Thus, with the specified dimensions the wall sleeve precursor member 10 can be converted into a complete, unitary wall sleeve assembly adaptable to the great majority of jobs. On the other hand, the sleeve length can be extended for walls of unusually large width as described in connection with FIG. 4. The external surface of member 10, thoughout at least sleeve sections 31,32 and water stop section 33, is preferably molded with a roughened texture to assure effective bonding to a concrete wall. The textured exterior surface may be used throughout member 10 if desired.

For conversion of wall sleeve precursor member 10 into a wall sleeve assembly usable in most applications, such as the wall sleeve assembly 40 shown in FIG. 2, it is only necessary to perform four cutting operations. Thus, end section 11 is cut from precursor member 10 along line 41 (FIG. 1). A similar cut along line 42 severs end section 21 from the precursor member. The remaining two cuts are made along lines 43 and 44; the location of cuts 43 and 44 will vary depending upon the particular length L required for the sleeve in a given wall. The two transition sections 15 and 25, often with attached short lengths of sleeve sections 31 and 32, may be discarded. If the precursor member is formed from a thermoplastic resin, the transition sections can be reclaimed for use in subsequent molding operations.

FIG. 2 illustrates a wall sleeve assembly 40 derived from the components cut from precursor member 10 of FIG. 1, and also shows the manner in which that wall sleeve assembly is mounted between the opposed panels 45 and 46 of a form for a concrete wall or floor. Thus, once the unitary one-piece cylindrical molded resin sleeve member 31-33 has been cut to the desired length L approximately matching the wall width W for the concrete wall, the first end member or cap 11 can be readily mounted on one form panel 45 by suitable means such as a plurality of nails 47. In mounting cap 11 on panel 45, the central aperture 18 in wall 13 is used to center the cap at a precise desired location marked on the panel. At the time this is done, form panel 46 is normally not in place and does not interfere with accurate positioning of end cap 11.

With the first end cap 11 mounted on form panel 45, the wall sleeve member 31-33 is seated on the end cap member as shown in FIG. 2. Because the external diameter D of end cap member 11 is closely matched to the internal diameter of sleeve section 31, there is a relatively tight fit between the open end portion of sleeve section 31 and the outer surface of body wall 12 of end member 11. Moreover, the substantial length L2 for end cap member 11 aids in assuring seating of the end of sleeve section 31 on the end cap member.

To complete the wall sleeve assembly 40, the second end cap member 21 is inserted into the open end of sleeve section 32, again affording a firm, well-aligned assembly. To complete mounting of the wall sleeve assembly within the concrete form, form panel 46 is now brought into position. If flange 24 is accessible from outside the form, it can be nailed to panel 46. In most instances, however, such access is inconvenient or even impossible. To hold the wall sleeve in the form, one or more guy wires 49 can be stapled to flange 24, with the other end of each guy wire stapled or otherwise secured to panel 45 before panel 46 is brought into position. Alternatively, wires can be used to suspend the wall sleeve from reinforcing bars (not shown) in the form. Either way, assembly 40 can be quickly, conveniently, and accurately located within form 45,46.

Assembly 40 is completely closed at both ends by members 11 and 21, so that debris and concrete are prevented from entering into the interior of the wall sleeve 31-33. If the width W between the concrete form panels 45 and 46 is slightly smaller than anticipated, the final positioning of panel 46 deflects the walls of water stop section 33 together, in the manner indicated by lines 51 in FIG. 1. On the other hand, if the wall width W is slightly larger than anticipated, the substantial lengths L2 of the end members 11 and 21 allows for a limited lengthening of assembly 40, yet still assures the prevention of entry of concrete into the interior of wall sleeve 31-33.

FIG. 3 illustrates wall sleeve 31-33 as positioned within a concrete wall 52 after the concrete has been poured and set and the form panels 45 and 46 and end caps 11 and 21 have been removed. A pipe 53 has been positioned within the sleeve, extending through wall 52, and one end of the pipe is shown sealed to the interior surface of sleeve section 31 by an annular closure seal comprising a plurality of overlapping elastomer blocks 54, pressure plates 55, and bolts 56. The seal is of the kind described in the aforementioned Barton U.S. Pat. No. 3,528,668. Another such seal may be utilized at the other side of wall 52, within sleeve section 32. All or part of the annular depression 61 left at each end of the wall sleeve when the end caps are removed may be filled in with grouting, as indicated at 62 for improved appearance, if desired.

The completed wall sleeve, FIG. 3, provides for accurate positioning of pipe 53 at the desired location through wall 52. The seal structure 54-56 effectively prevents passage of water or other fluids through the wall sleeve around the periphery of the pipe. Water stop 33 affords effective protection against seepage of water along the outer surface of the sleeve, at the interface between the sleeve and concrete wall. Furthermore, water stop 33 affords an effective anchor that prevents axial movement of the sleeve relative to the wall. The textured outer surface of sections 31-33 of the wall sleeve affords a good bond with the concrete 52 and helps prevent migration of water along the sleeve exterior. To assure effective performance of the dual anchoring and water stop functions for section 33, the overall radial extension of water stop section 33 beyond the diameter D of sleeve sections 31 and 32, dimension H2 in FIG. 1, should be about two inches or more. The rib height H3, on the other hand, should be much smaller; one-half inch is appropriate. In all instances the wall sleeve is much lighter than any comparable metal sleeve, and one-man installation is easily realized.

FIG. 4 illustrates a wall sleeve assembly 140 formed from two wall sleeve precursor members like member 10 of FIG. 1. The right-hand portion of assembly 140 includes a wall sleeve member comprising sleeve sections 131 and 132 joined by a water stop and anchor section 133. This portion of assembly 140 corresponds to the construction shown in FIGS. 1-3 except that each of the sleeve sections 131 and 132 includes a plurality of annular solid external reinforcing ribs 139. By utilizing consistent spacing between ribs 139, those ribs provide an index and guide for location and alignment of cutting of the sleeve sections. The end member 111 and transition section (not shown) have been cut from the right-hand end of sleeve section 131, as previously described, and end section 111 is shown in its assembled position, inserted into the sleeve.

At the left-hand end of sleeve section 132 in assembly 140, however, a different arrangement has been employed. Thus, the transition section 125 remains attached to sleeve section 132 and only the outer wall of end section 121 has been cut off, leaving its body portion 122 essentially intact. The end sleeve section 231 of a second wall sleeve is shown mounted on the projecting body portion 122 of end section 121. Sleeve section 231 is a part of a wall sleeve that includes another sleeve section 232 and a second water stop and anchor section 233. Because the internal diameter D of sleeve section 231 matches the external diameter of the wall 122 of end section 121, and because the body wall 122 has substantial length, a firm fit is afforded. To preclude any leakage into the interior of the wall sleeve assembly at the juncture of sleeve section 231 and body portion 122 (FIG. 4) a bead 239 of waterproof mastic (a silicone mastic is satisfactory) may be employed at the joint.

Accordingly, as can be seen from FIG. 4, by utilizing two or more precursor members like member 10 (FIG. 1) a wall sleeve assembly of virtually any desired length can be put together. Of course, for wall sleeves of relatively large diameter D, external hollow reinforcing ribs such as the ribs 137, 138 and 237 may be utilized. As previously noted, the small solid external ribs 139 afford an index and guide for cutting off any of the sleeve sections, in addition to their reinforcement function. Transition section 125 serves as an auxiliary water stop in the completed extended assembly 140.

Precursor members 10 and the wall sleeve assemblies formed therefrom afford a number of advantages. It remains necessary to provide precursor members of different diameters D to accommodate varying field requirements. Inventory needs are minimized, however, because each wall sleeve comes equipped with at least one water stop, with no added manufacturing procedures required, and the positioning of that water stop within the wall can be readily controlled by appropriate selection of the positions for the cuts, such as cuts 41,44, that are made in conversion of the precursor member into a wall sleeve assembly. One mold for each different diameter D is all that is required, allowing for completion of wall sleeve assemblies of virtually any desired length (see FIG. 4). As previously noted, the wall sleeve assemblies can accommodate minor variations, both undersize and oversize, in the wall width W. Although the wall sleeve assemblies of the invention are quite inexpensive, they permit accurate location of the wall sleeve within the concrete form, afford superior sealing properties both for the interior and exterior of the sleeve, and avoid corrosion problems.

I claim:

1. A unitary, one-piece molded resin wall sleeve precursor convertible into a wall sleeve assembly for forming a continuous unimpeded passageway of given internal diameter D through a concrete wall by cutting off end sections, transition sections, and portions of sleeve sections from a central sleeve member portion of the precursor and inserting the end sections into the remaining sleeve member, comprising:

first and second end sections, at opposite ends of the wall sleeve precursor member, each and section including a cylindrical body portion having an external diameter D and a substantially flat mounting flange projecting radially outwardly of the axially inner end of the body portion;

first and second transition sections adjoining the first and second end sections, respectively, and joining the end sections to opposite ends of a central sleeve member portion, each transition section including an outer transition wall extending axially inwardly from the outer rim of the mounting flange of the associated end section and a transition boundary wall extending radially inwardly from the outer transition wall;

and the central sleeve member portion comprising:

N coaxial cylindrical sleeve sections of internal diameter D interposed in series between the two transition sections; and N−1 annular, hollow, axially compressible water stop sections each interconnecting two adjacent sleeve sections, each water stop section having two spaced walls extending radially outwardly of the ends of the adjacent sleeve sections and interconnected by a water stop rim wall, the internal diameter of the rim wall being much larger than D.

2. A one-piece molded resin wall sleeve precursor according to claim 1 in which all sleeve and water stop sections have a roughened texture finish for improved bonding to concrete.

3. A one-piece molded resin wall sleeve precursor member according to claim 1 in which the body portion of each end section has an outer wall closing off its outer end to afford a cup-shaped configuration for the end section.

4. A one-piece molded resin wall sleeve precursor according to claim 3 in which the outer wall of each end section has a central alignment aperture extending therethrough.

5. A one-piece molded resin wall sleeve precursor according to claim 4 in which all sleeve and water stop sections have a roughened texture finish for improved bonding to concrete.

6. A one-piece molded resin wall sleeve precursor member according to claim 3 in which the two axially outermost sleeve sections each include at least one annular external reinforcing rib.

7. A one-piece molded resin wall sleeve precursor according to claim 6 in which the outer wall of each end section has a central alignment aperture extending therethrough.

8. A one-piece molded resin wall sleeve precursor according to claim 6 in which all sleeve and water stop sections have a roughened texture finish for improved bonding to concrete.

9. A one-piece molded resin wall sleeve precursor member according to claim 6 in which a plurality of solid external reinforcing ribs are disposed at predetermined positions axially of each sleeve section to afford a cutoff index for accurate cutting of a wall sleeve of given length from the precursor member.

10. A one-piece molded resin wall sleeve precursor member according to claim 3 in which each sleeve section includes a hollow reinforcing rib substantially smaller in diameter than the water stop section.

11. A one-piece molded resin wall sleeve precursor according to claim 10 in which all sleeve and water stop sections have a roughened texture finish for improved bonding to concrete.

12. A one-piece molded resin wall sleeve precursor according to claim 10 in which the outer wall of each end section has a central alignment aperture extending therethrough.

13. A one-piece molded resin wall sleeve precursor member according to claim 10 in which each sleeve section further includes a plurality of solid reinforcing ribs disposed at predetermined positions axially of the sleeve section to afford a cutoff index for accurate cutting of a wall sleeve of given length from the precursor member.

14. A one-piece molded resin wall sleeve precursor member according to claim 1 in which N=2, in which the overall length of the precursor between the transition sections is of the order of fifteen inches, and in which the water stop projects radially outwardly of the sleeve sections for at least about two inches.

15. A one-piece molded resin wall sleeve precursor member according to claim 14 in which the body portion of each end section has a length of at least one inch and an outer wall closing off its outer end to afford a cup-shaped configuration for the end section.

16. A one-piece molded resin wall sleeve precursor ccording to claim 15 in which the outer wall of each end section has a central alignment aperture extending therethrough.

17. A one-piece molded resin wall sleeve precursor according to claim 15 in which all sleeve and water stop sections have a roughened texture finish for improved bonding to concrete.

18. A one-piece molded resin wall sleeve precursor member according to claim 14 in which a plurality of solid external reinforcing ribs are disposed at predetermined positions axially of each sleeve section to afford a cutoff index for accurate cutting of a wall sleeve of given length from the precursor member.

19. A one-piece molded resin wall sleeve precursor member according to claim 18 in which the body portion of each end section has a length of at least one inch and an outer wall closing off its outer end to afford a cup-shaped configuration for the end section.

20. A one-piece molded resin wall sleeve precursor according to claim 19 in which all sleeve and water stop sections have a roughened texture finish for improved bonding to concrete and in which the outer wall of each end section has a central alignment aperture extending therethrough.

21. A one-piece molded resin wall sleeve precursor member according to claim 14 in which each sleeve section includes a hollow reinforcing rib substantially smaller in diameter than the water stop section.

22. A one-piece molded resin wall sleeve precursor member according to claim 21 in which the body portion of each end section has an outer wall closing off its outer end to afford a cup-shaped configuration for the end section.

23. A one-piece molded resin wall sleeve precursor according to claim 22 in which all sleeve and water stop sections have a roughened texture finish for improved bonding to concrete and in which the outer wall of each end section has a central alignment aperture extending therethrough.

24. A one-piece molded resin wall sleeve precursor member according to claim 21 in which each sleeve section further includes a plurality of solid reinforcing ribs disposed at predetermined positions axially of the sleeve section to afford a cutoff index for accurate cutting of a wall sleeve of given length from the precursor member.

25. A cylindrical wall sleeve assembly for forming an unimpeded passageway of given internal diameter D through a concrete wall of given width W, comprising:
a unitary one-piece cylindrical molded resin sleeve member having an overall length L approximately equal to the wall width W and including N coaxial cylindrical sleeve sections each having an internal diameter D, joined together by water stop means for precluding water flow along the outer surface of the sleeve member, the water stop means comprising N−1 annular, hollow, axially compressible water stop sections, each water stop section having two spaced walls extending radially outwardly of the end of two adjacent sleeve sections and interconnected by a water stop rim wall, the internal diameter of the rim wall being at least about four inches larger than D;
and a pair of end members, each end member including a cylindrical body having an external diameter D to fit tightly into the open end of an outer sleeve section of the sleeve member, each end member further having a substantially flat radially outwardly projecting mounting flange at its outer end which limits insertion of the end member into the sleeve member, the end member flanges comprising mounting means for mounting the assembly in fixed position between the opposed walls of a concrete form while allowing removal of both end members, upon dismantling of the form, for full exposure of the interior of the sleeve.

26. A wall sleeve assembly according to claim 25 in which all sleeve and water stop sections have a roughened texture finish for improved bonding to concrete.

27. A wall sleeve assembly according to claim 25 in which each end member includes an integral end wall across the end of the member opposite the flange to afford a cup-shaped configuration for the end member.

28. A wall sleeve assembly according to claim 27 in which the end wall of each end member has a central alignment aperture extending therethrough.

29. A wall sleeve assembly according to claim 28 in which all sleeve and water stop sections have a roughened texture finish for improved bonding to concrete.

30. A wall sleeve assembly according to claim 27 in which the two outermost sleeve sections each include at least one annular external reinforcing rib.

31. A wall sleeve assembly according to claim 30 in which all sleeve and water stop sections have a roughened texture finish for improved bonding to concrete.

32. A wall sleeve assembly according to claim 30 in which the end wall of each end member has a central alignment aperture extending therethrough.

33. A wall sleeve assembly according to claim 30 in which a plurality of solid external reinforcing ribs are disposed at predetermined positions axially of each sleeve section to afford a cutoff index for accurate cutting of a wall sleeve of given length from the precursor member.

34. A wall sleeve assembly according to claim 27 in which each sleeve section includes a hollow reinforcing rib substantially smaller in diameter than the water stop section.

35. A wall sleeve assembly according to claim 34 in which all sleeve and water stop sections have a roughened texture finish for improved bonding to concrete.

36. A wall sleeve assembly according to claim 34 in which the end wall of each end member has a central alignment aperture extending therethrough.

37. A wall sleeve assembly according to claim 34 in which each sleeve section further includes a plurality of solid reinforcing ribs disposed at predetermined positions axially of the sleeve section to afford a cutoff index for accurate cutting of a wall sleeve of given length from the precursor member.

38. A wall sleeve assembly according to claim 27, in which the outermost sleeve sections each have an axial length greater than the axial length of the body of each cup-shaped end member.

39. A cylindrical wall sleeve assembly for forming an unimpeded passageway of given internal diameter D through a concrete wall of given width W, comprising:
   a first unitary one-piece cylindrical molded resin sleeve member including two coaxial cylindrical sleeve sections each having an internal diameter D joined together by water stop means for precluding water flow along the outer surface of the first sleeve member, the water stop means comprising an annular, hollow, axially compressible water stop section having two spaced walls extending radially outwardly of the ends of the adjacent sleeve sections and interconnected by a water stop rim wall, the internal diameter of the rim wall being at least about four inches larger than D;
   a second unitary one-piece cylindrical molded resin sleeve member including a cylindrical sleeve section having an internal diameter D joined to a coaxial cylindrical end section having an external diameter D, the end section of the second sleeve member being inserted into one end of the first sleeve member in tight fitting relation to afford an assembled sleeve having an overall length L approximately equal to the wall width W;
   and a pair of end members, each end member including a cylindrical body having a external diameter D to fit tightly into an open end of the assembled sleeve, each end member further having a substantially flat radially outwardly projecting mounting flange at its outer end which limits insertion of the end member into the sleeve, the end member flanges comprising mounting means for mounting the assembly in fixed position between the opposed walls of a concrete form while allowing removal of both end members, upon dismantling of the form, for full exposure of the interior of the sleeve.

40. A wall sleeve assembly according to claim 39 in which the second sleeve member includes a hollow transition section having a diameter substantially larger than D that interconnects the sleeve and end sections of the second sleeve member to afford an auxiliary water stop section.

41. A wall sleeve assembly according to claim 39 in which all sleeve and water stop sections have a roughened texture finish for improved bonding to concrete.

42. A wall sleeve assembly according to claim 39 in which each end member has an integral end wall across the end of the member opposite the flange to afford a cup-shaped configuration for the end member and in which the end wall of each end member has a central alignment aperture extending therethrough.

* * * * *